June 17, 1924.

G. A. SCHULTE

INSECT PROOF CASTER

Filed Feb. 24, 1922

1,497,992

Inventor.

George A. Schulte,
By Frederick V. Winters
Attorney.

Patented June 17, 1924.

1,497,992

UNITED STATES PATENT OFFICE.

GEORGE A. SCHULTE, OF NEWARK, NEW JERSEY.

INSECTPROOF CASTER.

Application filed February 24, 1922. Serial No. 539,012.

*To all whom it may concern:*

Be it known that I, GEORGE A. SCHULTE, a citizen of the United States, residing at Newark, in the county of Essex and State of New Jersey, have invented certain new and useful Improvements in Insectproof Casters, of which the following is a full, clear, and exact specification.

This invention relates to casters for furniture, and has for its object to provide an improved form of insect proof caster of the dome type which is simple in construction, strongly made and will slide easily on the floor.

The invention will be first hereinafter described in connection with the accompanying drawings, which constitute part of this specification, and the more specifically defined in the claims at the end of the description.

In the accompanying drawings, wherein similar reference characters are used to designate corresponding parts throughout the several views:—

Figure 3:
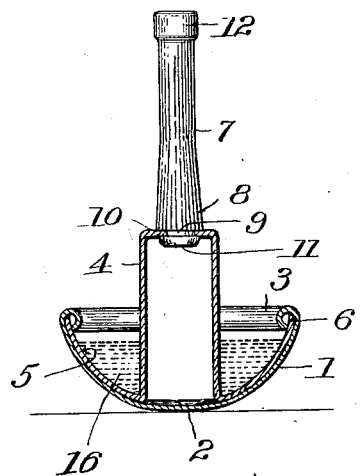
Figure 3 is a sectional view of the caster, the section being taken vertically through the center of the caster proper, and the shank being shown in elevation.
Figure 2:
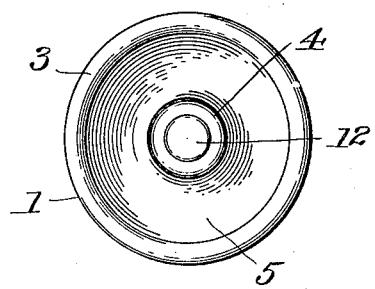
Figure 2 is a plan view of the caster.

The dome shaped caster body 1 is dished to hold an insecticide 16, Figure 3, and is formed with a base 2 on a curve having a greater radius than the side portions of said dome or body. This flattening of the base 2 prevents the caster from sinking into the floor and making dents therein when supporting heavy furniture, but the curved or convex form of said base insures the ready sliding movement of the caster on the floor.

The upper edge or margin of the caster body is curled inwardly as shown in Figure 3 to form an overhanging ledge or bead 3 which prevents the insecticide from splashing out of the said body when the furniture mounted on the caster is moved. Said ledge 3 is preferably formed on an outer piece of sheet metal constituting the outside surface of the caster body, and overlaps an inner piece of metal 5 which is shaped generally to fit within said outer piece and has its upper edge or margin extending into said bead or ledge 3, as shown at 6 in Figure 3.

Said inner metal piece is drawn or otherwise formed at the center into a hollow stem 4 of considerable diameter which stands erect in the middle of the caster body and is connected at its top to the shank 7 of the caster. Said stem 4 being of tubular form greatly strengthens the caster body, as does also the disked portion of the inner piece of metal 5 which fits within and reinforces the outer metal piece of said caster body.

The upper end of the stem 4 has an opening 10 formed therein, and the lower end of the shank 7 is riveted in said opening, as shown in Figure 3, there being a reduced portion 9 on the lower end of said shank fitted in said opening, and an enlarged flange 11 underlying said top of the stem around the opening. The shank 7 has its lower end portion 8 tapered just above the top of the stem 4 to center the shank in a hollow sleeve 14 in a caster retainer such as is illustrated in Figure 1, and the upper end of said shank has an enlarged head 12, preferably of the same diameter as the base of said tapered lower end 8, to be engaged by resilient spurs 13 on the upper portion of a spring member 17 of the caster retainer.

Figure 1:
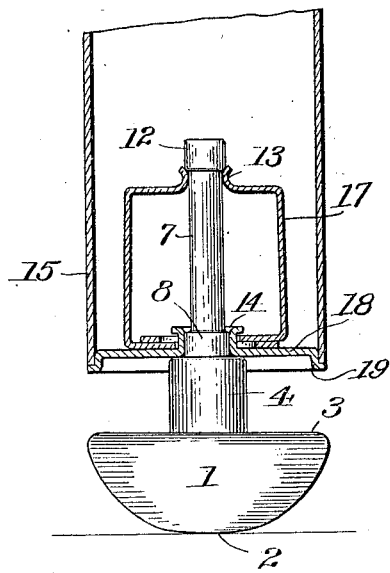
Figure 1 is an elevation of a caster made substantially in accordance with this invention, the same being shown mounted in a hollow furniture leg.

When the caster shank is engaged with the caster retainer, as shown in Figure 1, the spurs 13 engage below the head 12 and support the caster detachably in place in the furniture leg 15, while the tapered lower end 8 fits in the hollow sleeve 14 of the retainer and prevents movement and rattling of the lower end of the shank of the caster in said retainer when the furniture is moved. As illustrated in Figure 1, the spring member 17 of the retainer frictionally engages the internal walls of the socket in the furniture leg, and is connected to the mouth of said socket by a bridging member or disk 18 having a stepped annular flange 19 fitting in and overlapping the margin of said mouth.

No claim is made herein to the caster retainer as it is covered in my co-pending application, Ser. No. 539,011, filed on the same day as the present application.

I claim:

1. A dome caster having a dished metal outer piece, a metal stem having a dished bottom portion conforming to and fitted in said outer piece to form a reservoir for insecticide and a ledge on said outer piece extending inwardly over the edge of the dished bottom portion of said stem and overhanging said reservoir to prevent the insecticide from splasing out of the same.

2. A dome caster having a dished metal piece on the outside to engage the floor, an inner dished metal piece constituting a reservoir for insecticide, said inner piece fitting in said outer piece and having a stem, and an inwardly and downwardly curled bead on the edge of the outer piece inclosing the upper margin of the inner piece and overhanging said reservoir to prevent the insecticide from splashing out of the same.

3. A dome caster having a dished member to engage the floor, said member having a tubular stem, and a shank fastened to the upper end of said stem, said shank having its lower end portion tapered above the stem, and a head on its upper end of substantially the same diameter as the base of said tapered lower end.

In testimony whereof I have signed my name to this specification.

GEORGE A. SCHULTE.